July 5, 1927.
J. E. HUMMELL
1,634,578
ELECTRICAL FIXTURE HANGER
Filed Aug. 18, 1926
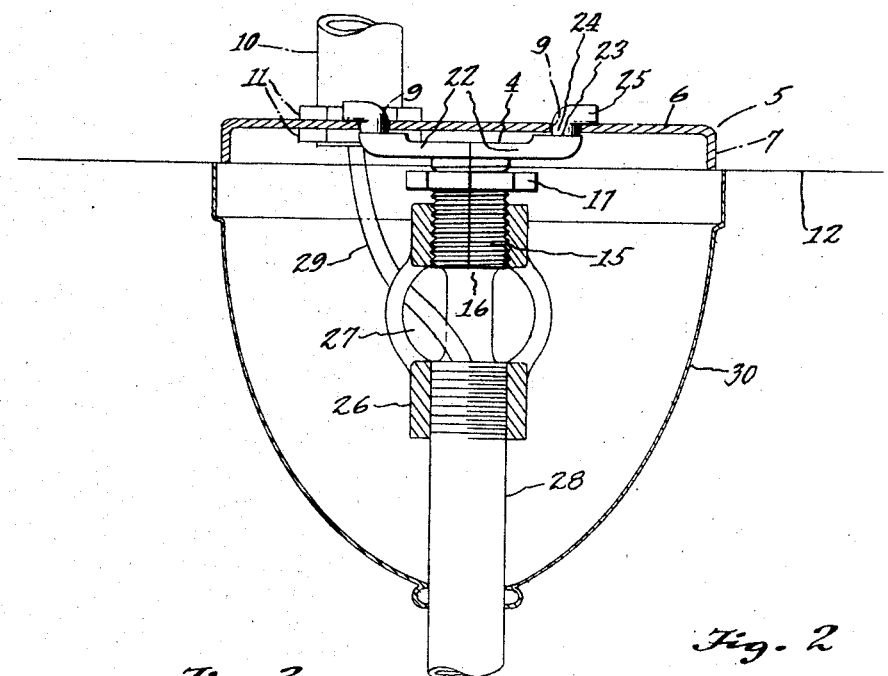
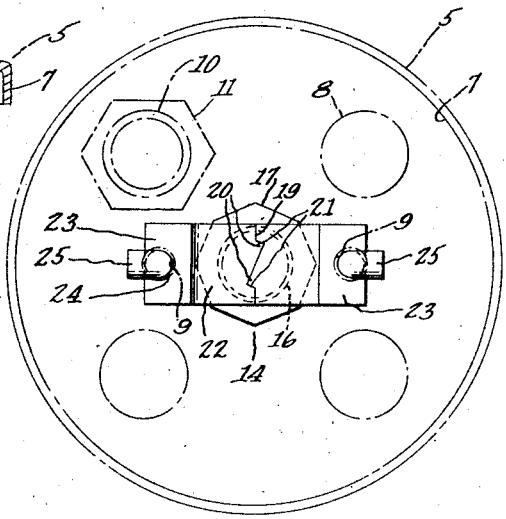
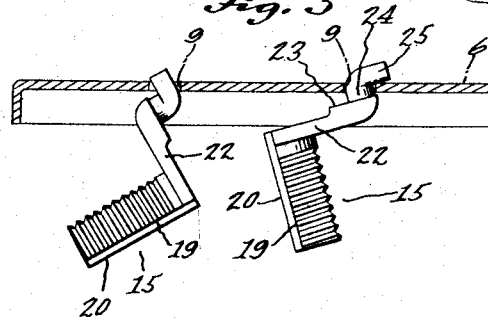
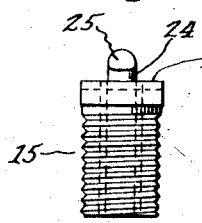
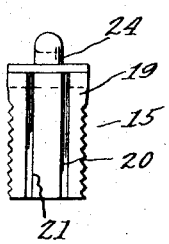
Inventor
John E. Hummell
By John A. Bommhardt
Att'y Patented July 5, 1927.

1,634,578

UNITED STATES PATENT OFFICE.

JOHN E. HUMMELL, OF CLEVELAND, OHIO.

ELECTRICAL-FIXTURE HANGER.

Application filed August 18, 1926. Serial No. 130,002.

This invention relates to new and useful improvements in hangers and more particularly electrical fixture hangers, providing means of simple structure adapted to be quickly and easily attached to an ordinary electrical conduit outlet box for mounting thereon a depending fixture such as an electrical lighting chandelier. Other objects and features of the invention will be hereinafter pointed out and described.

In the accompanying drawings, Figure 1 is a side view of the fixture hanger shown in heavy lines, applied to an electrical conduit outlet box shown in light lines together with a hanger supported fixture; Fig. 2 is a plan view of the hanger; Fig. 3 is a view showing the method of applying the hanger halves to the conduit outlet box; Figs. 4 and 5 are detail views of the interchangeable hanger halves.

Referring specifically to the drawings, 5 indicates a standard electrical conduit outlet box of sheet metal, having a back 6 with an annular depending flange 7. The back 6 has spaced openings 8 through which the ends of the electrical conduit pipes 10 are introduced and secured by lock nuts 11, and also has smaller spaced openings 9. The face 12 of the room ceiling is shown flush with the lower edge of flange 7.

The fixture hanger as shown in Fig. 1 and indicated at 14, comprises matched interchangeable half sections 15 forming an exteriorly threaded stud 16 and secured together by a nut 17, the butting faces 19 of the stud halves 18 having vertical ribs 20 fitting in grooves 21. Oppositely extending extensions 22 at the top of each stud half 18 have bosses 23 with round lugs 24 having offset supporting arms or hooks 25 extending oppositely. The bosses 23 of extensions 22 fit flatly against the plate 6 and prevent looseness or swaying of the chandelier or fixture.

The hanger 14 is attached to the conduit box 5 by removing nut 17 allowing the halves 15 to separate and the arms 25 thereof to be inserted into the box openings 9 as shown in Fig. 3. The lugs 25 are then pushed into the box openings 9 positioning the arms 25 on the opposite side of box plate 6 and the stud halves 18 together allowing the nut 17 to be threaded thereon. The ribs 20 and grooves 21 align the stud halves axially with the engagement thereof preventing displacement or side twist of the stud halves.

The fixture may be applied by threading a coupling 26 on stud 16, the upper end 28 of the fixture tube threading into the coupling. The electric wires 29 extending from conduit pipes 10 are led through an opening 27 in the coupling into the fixture tube 28 to the lights. A canopy 30 about tube 28 conceals the conduit box 5, hanger 14, coupling 26 and wires 29.

The hanger may be applied to different types of conduit outlet boxes or other supports occupying a minimum of space and providing a strong connection for the fixture and fittings.

The hanger may be economically manufactured and applied for use.

While I have shown and described one form of the invention, obviously various changes in the details of construction may be made without departing from the spirit and scope of the appended claims.

I claim:

1. A fixture hanger comprising a split stud formed of sections externally threaded to receive a screw threaded fastening member, each section having an offset lug engageable in an opening in a support.

2. A fixture hanger as set forth in claim 1, each section having a laterally projecting extension provided with said lugs.

3. The combination with a plate having spaced openings, of a hanger comprising a split stud formed of sections, each section having an offset lug engageable in one of said openings.

4. The combination stated in claim 3, the sections being externally threaded to receive a threaded member for holding the sections together.

In testimony whereof, I do affix my signature.

JOHN E. HUMMELL.